(12) United States Patent
Jung et al.

(10) Patent No.: US 9,449,307 B2
(45) Date of Patent: Sep. 20, 2016

(54) MANAGING A LIMITED-USE ELECTRONIC MAIL ACCOUNT

(75) Inventors: Edward K. Y. Jung, Bellevue, WA (US); Royce A. Levien, Lexington, MA (US); Mark A. Malamud, Seattle, WA (US); John D. Rinaldo, Jr., Bellevue, WA (US)

(73) Assignee: Invention Science Fund I, LLC, Bellevue, WA (US)

( * ) Notice: Subject to any disclaimer, the term of this patent is extended or adjusted under 35 U.S.C. 154(b) by 1261 days.

(21) Appl. No.: 11/107,343

(22) Filed: Apr. 15, 2005

(65) Prior Publication Data
US 2006/0167709 A1 Jul. 27, 2006

Related U.S. Application Data

(63) Continuation-in-part of application No. 11/041,894, filed on Jan. 21, 2005, and a continuation-in-part of application No. 11/046,224, filed on Jan. 28, 2005, and a continuation-in-part of application No. 11/066,728, filed on Feb. 25, 2005, and a continuation-in-part of application No. 11/087,727, filed on Mar. 22, 2005.

(51) Int. Cl.
| | |
|---|---|
| *G06F 15/16* | (2006.01) |
| *G06Q 10/10* | (2012.01) |
| *H04L 12/58* | (2006.01) |
| *H04L 29/06* | (2006.01) |

(52) U.S. Cl.
CPC ............. *G06Q 10/107* (2013.01); *H04L 12/58* (2013.01); *H04L 12/584* (2013.01); *H04L 51/08* (2013.01); *H04L 63/102* (2013.01)

(58) Field of Classification Search
CPC ....... H04L 12/58; H04L 41/026; H04L 5/12; H04L 51/18; H04L 12/584; H04L 51/08; H04L 63/102; G06Q 10/107
USPC .................................................. 709/206, 207
See application file for complete search history.

(56) References Cited

U.S. PATENT DOCUMENTS

| | | | |
|---|---|---|---|
| 5,375,240 A | 12/1994 | Grundy | |
| 5,799,067 A * | 8/1998 | Kikinis | ................ G06F 1/1616 |
| | | | 379/357.04 |
| 5,958,005 A * | 9/1999 | Thorne | ................ G06Q 10/107 |
| | | | 380/51 |
| 6,014,502 A | 1/2000 | Moraes | |
| 6,161,139 A | 12/2000 | Win et al. | |
| 6,219,786 B1 | 4/2001 | Cunningham et al. | |
| 6,272,636 B1 | 8/2001 | Neville et al. | |
| 6,324,569 B1 | 11/2001 | Ogilvie et al. | |
| 6,359,711 B1 | 3/2002 | Cole et al. | |
| 6,473,758 B1 | 10/2002 | Schwartz et al. | |

(Continued)

FOREIGN PATENT DOCUMENTS

CA        2353021        1/2003

OTHER PUBLICATIONS

U.S. Appl. No. 11/111,488, Jung et al.
(Continued)

*Primary Examiner* — Richard G Keehn
*Assistant Examiner* — Mohammed Ahmed

(57) ABSTRACT

In one aspect, a method related to a limited-use electronic mail account. In addition to the foregoing, other method and system and program product aspects are described in the claims, drawings, and text forming a part of the present application.

35 Claims, 11 Drawing Sheets

(56) References Cited

U.S. PATENT DOCUMENTS

| | | |
|---|---|---|
| 6,474,547 B1 | 11/2002 | Suzuki |
| 6,484,197 B1 | 11/2002 | Donohue |
| 6,487,586 B2 | 11/2002 | Ogilvie et al. |
| 6,643,688 B1 | 11/2003 | Fuisz |
| 6,701,347 B1 | 3/2004 | Ogilvie |
| 6,711,608 B1 | 3/2004 | Ogilvie |
| 6,732,101 B1 | 5/2004 | Cook |
| 6,757,713 B1 | 6/2004 | Ogilvie et al. |
| 7,016,877 B1 | 3/2006 | Steele et al. |
| 7,076,533 B1 | 7/2006 | Knox et al. |
| 7,082,439 B1 | 7/2006 | Hickman et al. |
| 7,171,562 B2 | 1/2007 | Brown et al. |
| 7,228,357 B2 | 6/2007 | Plewnia |
| 7,278,983 B2 | 10/2007 | Ireland et al. |
| 7,356,564 B2 | 4/2008 | Hartselle et al. |
| 7,447,756 B2 | 11/2008 | Malik |
| 7,469,280 B2 | 12/2008 | Simpson |
| 7,536,438 B2 | 5/2009 | Suzuki et al. |
| 7,590,697 B2 | 9/2009 | Ito et al. |
| 7,627,652 B1 | 12/2009 | Commons et al. |
| 8,234,339 B2 | 7/2012 | Adams et al. |
| 8,370,437 B2 | 2/2013 | Duffek et al. |
| 2001/0034720 A1 | 10/2001 | Armes |
| 2002/0016735 A1 | 2/2002 | Runge et al. |
| 2002/0023135 A1 | 2/2002 | Shuster |
| 2002/0069253 A1 | 6/2002 | Kazui et al. |
| 2002/0087641 A1 | 7/2002 | Levosky |
| 2002/0087645 A1 | 7/2002 | Ertugrul et al. |
| 2002/0120564 A1 | 8/2002 | Strietzel |
| 2002/0138581 A1 | 9/2002 | MacIntosh et al. |
| 2002/0156848 A1 | 10/2002 | Grouse |
| 2002/0173308 A1 | 11/2002 | Dorenbosch et al. |
| 2002/0173344 A1 | 11/2002 | Cupps et al. |
| 2003/0028597 A1 | 2/2003 | Salmi et al. |
| 2003/0065713 A1 | 4/2003 | Quach et al. |
| 2003/0069934 A1 | 4/2003 | Garcia-Martin et al. |
| 2003/0074412 A1 | 4/2003 | Muto |
| 2003/0088786 A1 | 5/2003 | Moran et al. |
| 2003/0090572 A1 | 5/2003 | Belz et al. |
| 2003/0131060 A1* | 7/2003 | Hartselle ............ G06Q 10/107 709/206 |
| 2003/0140103 A1 | 7/2003 | Szeto et al. |
| 2003/0177248 A1 | 9/2003 | Brown et al. |
| 2003/0195842 A1 | 10/2003 | Reece |
| 2003/0220976 A1 | 11/2003 | Malik |
| 2003/0220977 A1 | 11/2003 | Malik |
| 2003/0233415 A1* | 12/2003 | Beyda ............................ 709/206 |
| 2004/0030917 A1 | 2/2004 | Karamchedu et al. |
| 2004/0049696 A1* | 3/2004 | Baker ................. G06Q 10/107 726/1 |
| 2004/0068440 A1 | 4/2004 | Porato |
| 2004/0078325 A1 | 4/2004 | O'Connor |
| 2004/0117451 A1 | 6/2004 | Chung |
| 2004/0128512 A1 | 7/2004 | Sharma et al. |
| 2004/0158532 A1 | 8/2004 | Breck et al. |
| 2004/0210448 A1 | 10/2004 | Breck et al. |
| 2004/0210449 A1 | 10/2004 | Breck et al. |
| 2004/0230657 A1 | 11/2004 | Tomkow |
| 2004/0243679 A1* | 12/2004 | Tyler ............................ 709/206 |
| 2004/0243844 A1 | 12/2004 | Adkins |
| 2004/0254996 A1 | 12/2004 | Yabe et al. |
| 2005/0015448 A1 | 1/2005 | Smith et al. |
| 2005/0038687 A1 | 2/2005 | Galdes |
| 2005/0050324 A1 | 3/2005 | Corbett et al. |
| 2005/0136988 A1 | 6/2005 | Villamil et al. |
| 2005/0144244 A1 | 6/2005 | Landesmann |
| 2005/0204008 A1* | 9/2005 | Shinbrood ............ H04L 12/584 709/206 |
| 2005/0206549 A1 | 9/2005 | Stefanik |
| 2005/0228723 A1 | 10/2005 | Malik |
| 2005/0267937 A1* | 12/2005 | Daniels ................... H04L 12/58 709/206 |
| 2006/0031319 A1 | 2/2006 | Nelson et al. |
| 2006/0064646 A1 | 3/2006 | Kelso et al. |
| 2006/0085505 A1 | 4/2006 | Gillum et al. |
| 2006/0093126 A1* | 5/2006 | Wesen ................ H04L 12/5885 379/265.09 |
| 2006/0106914 A1 | 5/2006 | Plow et al. |
| 2006/0112165 A9 | 5/2006 | Tomkow et al. |
| 2006/0141981 A1 | 6/2006 | Lin |
| 2006/0168046 A1 | 7/2006 | Qureshi |
| 2006/0195527 A1 | 8/2006 | Allen et al. |
| 2007/0078677 A1 | 4/2007 | Hofstetter |
| 2007/0117538 A1 | 5/2007 | Weiser et al. |
| 2007/0180039 A1 | 8/2007 | Sutidze et al. |
| 2008/0205610 A1 | 8/2008 | Bishop |
| 2010/0077051 A1 | 3/2010 | Daniell et al. |

OTHER PUBLICATIONS

"VISA Account Information Security"; Visa Public; bearing a date of Mar. 1, 2000; 48 pp.; Version 1.4; Visa International.

PCT International Search Report; International App. No. PCT/US06/01657; Sep. 18, 2006.

PCT International Search Report; International App. No. PCT/US06/02273; Jul. 18, 2008; pp. 1-2.

"GuerrillaMail—Disposable Temporary E-Mail Address"; guerrillamail.com; created on Feb. 26, 2014; 4 pages.

"Tor Project: Anonymity Online"; Tor Project; created on Feb. 26, 2014; 4 pages; located at https://www.torproject.org/index.html.en.

Wolff, Josephine; "C+ in Online Anonymity"; slate.com; Dec. 18, 2013; 4 pages; located at http://www.slate.com/articles/technology/future_tense/2013/12/harvard_exam_bomb_threads_how_the_alleged_hoaxer_failed_to_cover_his_onlien.html; The Slate Group, LLC.

\* cited by examiner

MANAGING A LIMITED-USE ELECTRONIC MAIL ACCOUNT

CROSS-REFERENCE TO RELATED APPLICATIONS

The present application is related to, claims the earliest available effective filing date(s) from (e.g., claims earliest available priority dates for other than provisional patent applications; claims benefits under 35 USC §119(e) for provisional patent applications), and incorporates by reference in its entirety all subject matter of the following listed application(s) (the "Related Applications") to the extent such subject matter is not inconsistent herewith; the present application also claims the earliest available effective filing date(s) from, and also incorporates by reference in its entirety all subject matter of any and all parent, grandparent, great-grandparent, etc. applications of the Related Application(s) to the extent such subject matter is not inconsistent herewith. The United States Patent Office (USPTO) has published a notice to the effect that the USPTO's computer programs require that patent applicants reference both a serial number and indicate whether an application is a continuation or continuation in part. The present applicant entity has provided below a specific reference to the application(s)from which priority is being claimed as recited by statute. Applicant entity understands that the statute is unambiguous in its specific reference language and does not require either a serial number or any characterization such as "continuation" or "continuation-in-part." Notwithstanding the foregoing, applicant entity understands that the USPTO's computer programs have certain data entry requirements, and hence applicant entity is designating the present application as a continuation in part of its parent applications, but expressly points out that such designations are not to be construed in any way as any type of commentary and/or admission as to whether or not the present application contains any new matter in addition to the matter of its parent application(s).

RELATED APPLICATIONS

1. For purposes of the USPTO extra-statutory requirements, the present application constitutes a continuation in part of U.S. patent application entitled LIMITED-LIFE ELECTRONIC MAIL ACCOUNT AS INTERMEDIARY, naming Paul G. Allen; Edward K.Y. Jung; Royce A. Levien; Mark A. Malamud; and John D. Rinaldo, Jr. as inventors, U.S. application Ser. No. 11/041,894, filed Jan. 21, 2005, which is currently co-pending, or is an application of which a currently co-pending application is entitled to the benefit of the filing date.

2. For purposes of the USPTO extra-statutory requirements, the present application constitutes a continuation in part of U.S. patent application entitled LIMITED-LIFE ELECTRONIC MAIL ACCOUNTS naming Paul G. Allen; Edward K.Y. Jung; Royce A. Levien; Mark A. Malamud; and John D. Rinaldo, Jr. as inventors, U.S. application Ser. No. 11/046,224, filed Jan. 28, 2005, which is currently co-pending, or is an application of which a currently co-pending application is entitled to the benefit of the filing date.

3. For purposes of the USPTO extra-statutory requirements, the present application constitutes a continuation in part of U.S. patent application entitled LIMITED-OPERATION ELECTRONIC MAIL ACCOUNTS WITH SET FUNCTIONS naming Paul G. Allen, Edward K.Y. Jung; Royce A. Levien; Mark A. Malamud; and John D. Rinaldo, Jr. as inventors, U.S. application Ser. No. 11/066,728 filed Feb. 25, 2005, which is currently co-pending, or is an application of which a currently co-pending application is entitled to the benefit of the filing date.

4. For purposes of the USPTO extra-statutory requirements, the present application constitutes a continuation in part of U.S. patent application entitled INTERFACE FOR CREATION OF LIMITED-USE ELECTRONIC MAIL ACCOUNTS naming Edward K.Y. Jung; Royce A. Levien; Mark A. Malamud; and John D. Rinaldo, Jr. as inventors, U.S. application Ser. No. 11/087,727 filed Mar. 22, 2005, which is currently co-pending, or is an application of which a currently co-pending application is entitled to the benefit of the filing date.

TECHNICAL FIELD

The present application relates, in general, to electronic mail.

SUMMARY

In one aspect, a method related to electronic mail includes but is not limited to; receiving a signal related to a receipt of an item of electronic mail by a limited-use electronic mail account; and transmitting a signal related to the receipt of the item of electronic mail by the limited-use electronic mail account. In addition to the foregoing, other method aspects are described in the claims, drawings, and text forming a part of the present application.

In one aspect, a system related to electronic mail includes but is not limited to: circuitry for receiving a signal related to a receipt of an item of electronic mail by a limited-use electronic mail account; and circuitry for transmitting a signal related to the receipt of the item of electronic mail by the limited-use electronic mail account. In addition to the foregoing, other system aspects are described in the claims, drawings, and text forming a part of the present application.

In one or more various aspects, related systems include but are not limited to circuitry and/or programming and/or electromechanical devices and/or optical devices for effecting the herein-referenced method aspects; the circuitry and/or programming and/or electromechanical devices and/or optical devices can be virtually any combination of hardware, software, and/or firmware configured to effect the herein-referenced method aspects depending upon the design choices of the system designer skilled in the art.

In one aspect, a program product includes but is not limited to: a signal bearing medium bearing one or more instructions for receiving a signal related to a receipt of an item of electronic mail by a limited-use electronic mail account, and one or more instructions for transmitting a signal related to the receipt of the item of electronic mail by the limited-use electronic mail account. In addition to the foregoing, other program product aspects are described in the claims, drawings, and text forming a part of the present application.

In one aspect, a method related to electronic mail includes but is not limited to detecting a receipt of an item of electronic mail by a limited-use electronic mail account; and transmitting a notification of the receipt of the item of electronic mail by the limited-use electronic mail account. In addition to the foregoing, other method aspects are described in the claims, drawings, and text forming a part of the present application.

In one aspect, a system related to electronic mail includes but is not limited to circuitry for detecting a receipt of an item of electronic mail by a limited-use electronic mail account; and circuitry for transmitting a notification of the receipt of the item of electronic mail by the limited-use electronic mail account. In addition to the foregoing, other system aspects are described in the claims, drawings, and text forming a part of the present application.

In one or more various aspects, related systems include but are not limited to circuitry and/or programming and/or electromechanical devices and/or optical devices for effecting the herein-referenced method aspects; the circuitry and/or programming and/or electromechanical devices and/or optical devices can be virtually any combination of hardware, software, and/or firmware configured to effect the herein-referenced method aspects depending upon the design choices of the system designer skilled in the art.

In one aspect, a program product includes but is not limited to a signal bearing medium bearing one or more instructions for detecting a receipt of an item of electronic mail by a limited-use electronic mail account; and one or more instructions for transmitting a notification of the receipt of the item of electronic mail by the limited-use electronic mail account. In addition to the foregoing, other program product aspects are described in the claims, drawings, and text forming a part of the present application.

In addition to the foregoing, various other method, system, and/or program product aspects are set forth and described in the teachings such as the text (e.g., claims and/or detailed description) and/or drawings of the present application.

The foregoing is a summary and thus contains, by necessity, simplifications, generalizations and omissions of detail; consequently, those skilled in the art will appreciate that the summary is illustrative only and is NOT intended to be in any way limiting. Other aspects, features, and advantages of the devices and/or processes and/or other subject matter described herein will become apparent in the teachings set forth herein.

BRIEF DESCRIPTION OF THE FIGURES

The use of the same symbols in different drawings typically indicates similar or identical items.

DETAILED DESCRIPTION

Figure 1:
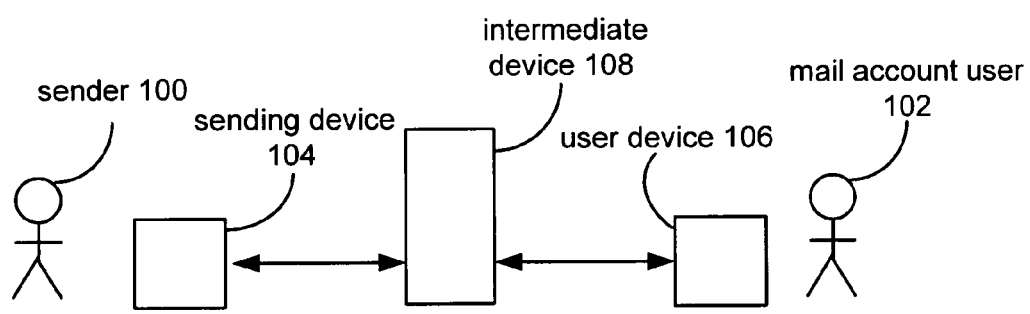
FIG. 1 depicts one implementation of an exemplary environment in which the methods and systems described herein may be represented.

With reference to the figures, FIG. 1 depicts one implementation of an exemplary environment in which the methods and systems described herein may be represented. The sender 100 is the sender of an item of electronic mail to the electronic mail account user 102 (hereinafter "user 102"). The sender 100 uses sending device 104, which may be one or more of a wireless handheld device, a laptop computer, a personal computer, a desk computer, a computer system terminal, or any other device capable of providing an interface between the sender 100 and an electronic mail account from which an item of electronic mail may be sent. The user 102 uses a user device 106, which may be one or more of a wireless handheld device, a laptop computer, a personal computer, a desk computer, a computer system terminal, or any other device capable of providing an interface between the user 102 and an electronic mail account that may receive the item of electronic mail sent by the sender 100. Intermediate device 108 is exemplary of any and all intermediate devices that may provide paths and/or computational resources, e.g., one or more electronic mail servers and/or transmission media, to carry the item of electronic mail from the sender 100 to the user 102 via sending device 104 and user device 106. Although user 102 is shown herein as a single illustrated figure, those skilled in the art will appreciate that user 102 may be a human user, a robotic user (e.g., a computational entity), and/or substantially any combination thereof (e.g., a user may be assisted by one or more robotic agents). In addition, user 102, as set forth herein, although shown as a single entity may in fact be composed of two or more entities. Those skilled in the art will appreciate that, in general, the same may be said of "sender" as such term is used herein.

At least user device 106 or intermediate device 108, operating independently or together, are capable of receiving a signal related to a receipt of an item of electronic mail by a limited-use electronic mail account and of transmitting a signal related to the receipt of the item of electronic mail by the limited-use electronic mail account, depending on the specific implementation. At least user device 106 or intermediate device 108 or both, operating independently and/or together, are capable of detecting a receipt of an item of electronic mail by a limited-use electronic mail account and of transmitting a signal related to the receipt of the item of electronic mail by the limited-use electronic mail account, depending on the specific implementation.

One skilled in the art will recognize that the herein described components (e.g., steps), devices, and objects and the discussion accompanying them are used as examples for the sake of conceptual clarity and that various configuration modifications are within the skill of those in the art. Consequently, as used herein, the specific exemplars set forth and the accompanying discussion are intended to be representative of their more general classes. In general, use of any specific exemplar herein is also intended to be representative of its class, and the non-inclusion of such specific components (e.g., steps), devices, and objects herein should not be taken as indicating that limitation is desired.

Following are a series of flowcharts depicting implementations of processes. For ease of understanding, the flowcharts are organized such that the initial flowcharts present implementations via an overall "big picture" viewpoint and thereafter the following flowcharts present alternate implementations and/or expansions of the "big picture" flowcharts as either sub-steps or additional steps building on one or more earlier-presented flowcharts. Those having skill in the art will appreciate that the style of presentation utilized herein (e.g., beginning with a presentation of a flowchart(s) presenting an overall view and thereafter providing additions to and/or further details in subsequent flowcharts) generally allows for a rapid and easy understanding of the various process implementations. In addition, those skilled in the art will further appreciate that the style of presentation used herein also lends itself well to modular and/or object-oriented program design paradigms.

Figure 2:
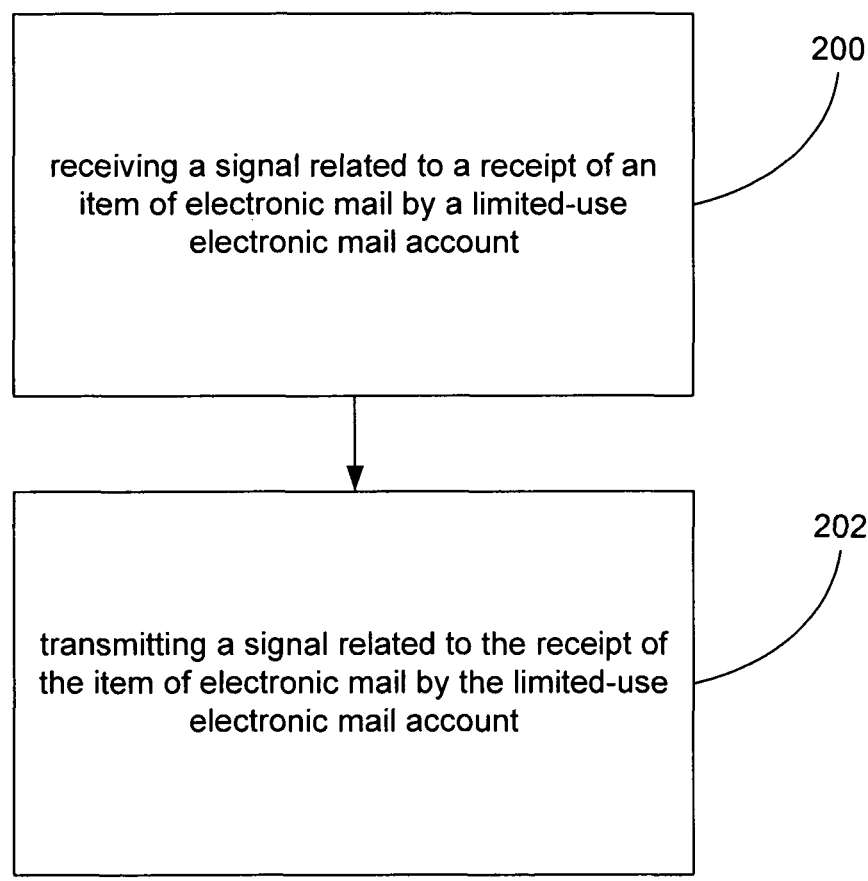
FIG. 2 depicts a high-level flowchart of an operational process.

FIG. 2 depicts a high-level flowchart of an operational process. Operation 200 shows receiving a signal related to a receipt of an item of electronic mail by a limited-use electronic mail account. Operation 202 depicts transmitting a signal related to the receipt of the item of electronic mail by the limited-use electronic mail account. The exemplary environment of FIG. 1 can serve to illustrate examples of operations described herein. In one example, illustrating operation 200, the sender 100 uses sending device 104 to send an item of electronic mail to the limited-use electronic mail account of user 102, who may access the limited-use electronic mail account using user device 106. After the item of electronic mail is received by the limited-use electronic mail account by means of hardware/firmware/software embodied logic of intermediate device 108, a signal related to the receipt of the item of electronic mail is received by means of hardware/firmware/software embodied logic of intermediate device 108. In one example of operation 202, a signal related to the receipt of the item of electronic mail by the limited-use electronic mail account is transmitted by means of hardware/firmware/software embodied logic of intermediate device 108.

Figure 3:
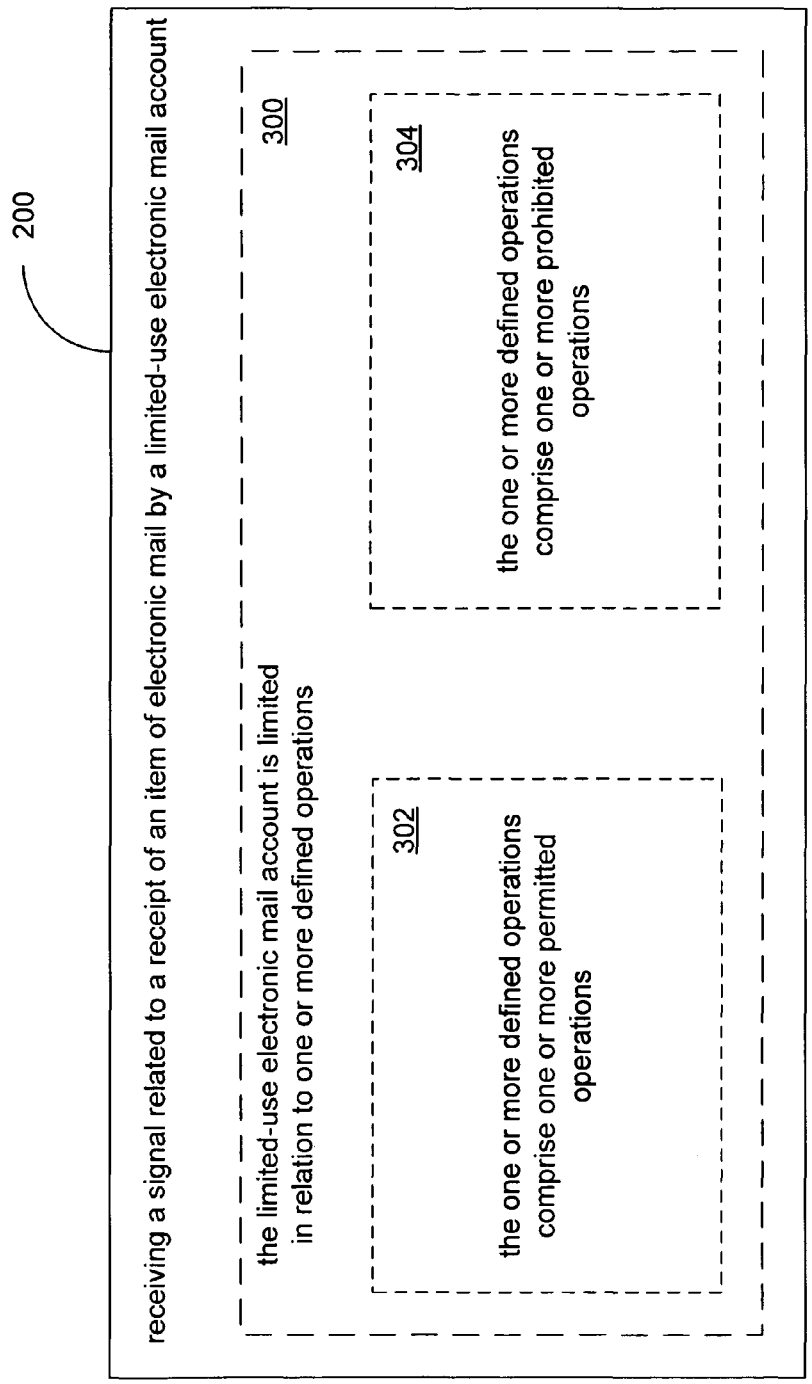
FIG. 3 illustrates several alternate implementations of the high-level logic flowchart of FIG. 2.

FIG. 3 illustrates several alternate implementations of the high-level logic flowchart of FIG. 2. Depicted is that one alternative implementation, operation 200—receiving a signal related to a receipt of an item of electronic mail by a limited-use electronic mail account—includes an operation 300 which shows receiving a signal related to a receipt of an item of electronic mail by an electronic mail account limited in relation to one or more defined operations (e.g., the limited-use electronic mail account has limited-use aspects defined by means of hardware/firmware/software embodied logic of intermediate device 108 and/or the user device 106). Illustrated is that in various implementations, operation 300 may include one or more of operations 302 and/or 304. Operation 302 depicts that in one implementation operation 300—receiving a signal related to a receipt of an item of electronic mail by an electronic mail account limited in relation to one or more defined operations—may include receiving a signal related to a receipt of an item of electronic mail by an electronic mail account limited in relation to one or more permitted operations.

In one instance, receiving a signal related to a receipt of an item of electronic mail by a limited-use electronic mail account limited in relation to one or more permitted operations (operation 302) may include but is not limited to intermediate device 108, sending device 104, and/or user device 106 receiving a signal related to a receipt of an item of electronic mail by a limited-use electronic mail account limited in relation to a permitted printing and/or viewing of a received and/or a stored item of electronic mail (e.g., limited in relation to permissions regarding printing/viewing an item at and/or received through various devices (e.g., intermediate device 108, sending device 104 and/or user device 106 and the like) and/or related to user ids associated with the various devices/people).

In another instance, receiving a signal related to a receipt of an item of electronic mail by a limited-use electronic mail account limited in relation to one or more permitted operations (operation 302) may include but is not limited to intermediate device 108, sending device 104, and/or user device 106 receiving a signal related to a receipt of an item of electronic mail by a limited-use electronic mail account limited in relation to a permitted printing and/or viewing of a transmitted item of electronic mail (e.g., limited in relation to permissions regarding printing/viewing an item transmitted to and/or by various devices (e.g., sending device 104 and/or user device 106 and the like) and/or transmitted to and/or by user ids associated with various devices/people).

In another instance, receiving a signal related to a receipt of an item of electronic mail by a limited-use electronic mail account limited in relation to one or more permitted operations (operation 302) may include but is not limited to intermediate device 108, sending device 104, and/or user device 106 receiving a signal related to a receipt of an item of electronic mail by a limited-use electronic mail account limited in relation to a permitted copying of an item of electronic mail (e.g., limited in relation to permissions regarding copying of an item stored by various devices (e.g., intermediate device 108, sending device 104, and/or user device 106 and the like) and/or related to user ids associated with various devices/people).

In another instance, receiving a signal related to a receipt of an item of electronic mail by a limited-use electronic mail account limited in relation to one or more permitted operations (operation 302) may include but is not limited to intermediate device 108, sending device 104, and/or user device 106 receiving a signal related to a receipt of an item of electronic mail by a limited-use electronic mail account limited in relation to permitted printing of a draft item of electronic mail (e.g., limited in relation to permissions regarding printing an item denoted as "draft" stored by various devices (e.g., intermediate device 108, sending device 104 and/or user device 106 and the like) and/or related to user ids associated with various devices/people).

In another instance, receiving a signal related to a receipt of an item of electronic mail by a limited-use electronic mail account limited in relation to one or more permitted operations (operation 302) may include but is not limited to intermediate device 108, sending device 104, and/or user device 106 receiving a signal related to a receipt of an item of electronic mail by a limited-use electronic mail account limited in relation to a permitted manipulating of an item of electronic mail related to a defined project (e.g., limited in relation to permissions regarding accepting electronic mail items containing a specified project identifier such as a specified phrase in the subject line or a specified attachment, and/or a specified thread in a BBS/mail-based forum).

In another instance, receiving a signal related to a receipt of an item of electronic mail by a limited-use electronic mail account limited in relation to one or more permitted operations (operation 302) may include but is not limited to intermediate device 108, sending device 104, and/or user device 106 receiving a signal related to a receipt of an item of electronic mail by a limited-use electronic mail account limited in relation to a permitted forwarding of an item of electronic mail; archiving and/or saving an item of electronic mail (e.g., limited in relation to permission regarding forwarding an item of electronic mail to a specified electronic mail account provided by mail account user 102).

In another instance, receiving a signal related to a receipt of an item of electronic mail by a limited-use electronic mail account limited in relation to one or more permitted operations (operation 302) may include but is not limited to intermediate device 108, sending device 104, and/or user device 106 receiving a signal related to a receipt of an item of electronic mail by a limited-use electronic mail account limited in relation to a permitted archiving and/or saving of an item of electronic mail (e.g., limited in relation to permissions regarding archiving or saving of an identified item of electronic mail by various devices (e.g., intermediate device 108, sending device 104, and/or user device 106).

In another instance, receiving a signal related to a receipt of an item of electronic mail by a limited-use electronic mail account limited in relation to one or more permitted operations (operation 302) may include but is not limited to intermediate device 108, sending device 104, and/or user device 106 receiving a signal related to a receipt of an item of electronic mail by a limited-use electronic mail account limited in relation to a permitted logging of an item of electronic mail (e.g., limited in relation to permissions regarding logging of an identified item of electronic mail, such as, e.g., various devices (e.g., intermediate device 108, sending device 104 and/or user device 106 and the like) detecting an attempted and/or actual sending of a blind (Bcc) copy to a Bcc email account existing to receive a copy of an email sent by a specified person or entity).

In another instance, receiving a signal related to a receipt of an item of electronic mail by a limited-use electronic mail account limited in relation to one or more permitted operations may include but is not limited to intermediate device 108, sending device 104, and/or user device 106 receiving a signal related to a receipt of an item of electronic mail by a limited-use electronic mail account limited in relation to permitting accepting one or more items of electronic mail (e.g., detecting an appearance of one or more items of electronic mail and accepting the mail into a limited group of email addresses associated with the one or more items of electronic mail and/or notifying mail account user 102 of the accepted electronic mail).

In another instance, receiving a signal related to a receipt of an item of electronic mail by a limited-use electronic mail account limited in relation to one or more permitted operations (operation 302) may include but is not limited to intermediate device 108, sending device 104, and/or user device 106 receiving a signal related to a receipt of an item of electronic mail by a limited-use electronic mail account limited in relation to a permitted sending of an item of electronic mail (e.g., limited in relation to permissions regarding sending a defined number of replies to an email received from a specific address and/or having a specific content, or, e.g., limited in relation to replying to at least one received item of electronic mail, or, e.g., limited in relation to sending from a mail account which does not accept replies).

Operation 304 depicts that in one implementation operation 300—receiving a signal related to a receipt of an item of electronic mail by an electronic mail account limited in relation to one or more defined operations—may include receiving a signal related to a receipt of an item of electronic mail by an electronic mail account limited in relation to one or more prohibited operations.

In one instance, receiving a signal related to a receipt of an item of electronic mail by a limited-use electronic mail account limited in relation to one or more prohibited operations (operation 304) may include but is not limited to intermediate device 108, sending device 104, and/or user device 106 receiving a signal related to a receipt of an item of electronic mail by a limited-use electronic mail account limited in relation to a prohibited printing and/or viewing of a received and/or a stored item of electronic mail (e.g., limited in relation to prohibitions regarding printing/viewing of an item related to various devices (e.g., sending device 104 and/or user device 106 and the like) and/or related to user ids associated with the various devices/people, and/or printing and/or viewing of emails associated with defined groups of email addresses e.g., for a specified number of times or for a specified period of time).

In another instance, receiving a signal related to a receipt of an item of electronic mail by a limited-use electronic mail account limited in relation to one or more prohibited operations (operation 304) may include but is not limited to intermediate device 108, sending device 104, and/or user device 106 receiving a signal related to a receipt of an item of electronic mail by a limited-use electronic mail account limited in relation to a prohibited printing and/or viewing of a transmitted item of electronic mail (e.g., limited in relation to prohibitions regarding performing printing of an item transmitted to and/or by various devices (e.g., sending device 104 and/or user device 106 and the like) and/or user ids associated with various devices/people).

In another instance, receiving a signal related to a receipt of an item of electronic mail by a limited-use electronic mail account limited in relation to one or more prohibited operations (operation 304) may include but is not limited to intermediate device 108, sending device 104, and/or user device 106 receiving a signal related to a receipt of an item of electronic mail by a limited-use electronic mail account limited in relation to a prohibited copying of an item of electronic mail (e.g., limited in relation to prohibitions regarding copying an item stored by various devices).

In another instance, receiving a signal related to a receipt of an item of electronic mail by a limited-use electronic mail account limited in relation to one or more prohibited operations (operation 304) may include but is not limited to intermediate device 108, sending device 104, and/or user device 106 receiving a signal related to a receipt of an item of electronic mail by a limited-use electronic mail account limited in relation to a prohibited printing of a draft item of electronic mail (e.g., limited in relation to prohibitions regarding printing of an item denoted as "draft" stored by various devices (e.g., intermediate device 108, sending device 104 and/or user device 106 and the like) and/or an item denoted by user ids associated with various devices/people).

In another instance, receiving a signal related to a receipt of an item of electronic mail by a limited-use electronic mail account limited in relation to one or more prohibited operations (operation 304) may include but is not limited to intermediate device 108, sending device 104, and/or user device 106 receiving a signal related to a receipt of an item of electronic mail by a limited-use electronic mail account limited in relation to a prohibited manipulating of an item of electronic mail related to a defined project (e.g., limited in relation to prohibitions regarding a sending, receiving, viewing, copying, etc. of an email of a limited-use electronic mail account).

In another instance, receiving a signal related to a receipt of an item of electronic mail by a limited-use electronic mail account limited in relation to one or more prohibited operations (operation 304) may include but is not limited to intermediate device 108, sending device 104, and/or user device 106 receiving a signal related to a receipt of an item of electronic mail by a limited-use electronic mail account limited in relation to a prohibited forwarding of an item of electronic mail (e.g., limited in relation to prohibitions regarding forwarding of an item of electronic mail of an electronic mail account).

In another instance, receiving a signal related to a receipt of an item of electronic mail by a limited-use electronic mail account limited in relation to one or more prohibited operations (operation 304) may include but is not limited to intermediate device 108, sending device 104, and/or user device 106 receiving a signal related to a receipt of an item of electronic mail by a limited-use electronic mail account limited in relation to a prohibited archiving and/or saving of an item of electronic mail (e.g., directing the archiving or saving an item of electronic mail of a limited-use electronic mail account).

In another instance, receiving a signal related to a receipt of an item of electronic mail by a limited-use electronic mail account limited in relation to one or more prohibited operations (operation 304) may include but is not limited to intermediate device 108, sending device 104, and/or user device 106 receiving a signal related to a receipt of an item of electronic mail by a limited-use electronic mail account limited in relation to logging of an item of electronic mail (e.g., limited in relation to prohibitions regarding a limited-use electronic mail account logging a piece of email, e.g., sending a blind (Bcc) copy to a Bcc email account of an item of electronic mail).

In another instance, receiving a signal related to a receipt of an item of electronic mail by a limited-use electronic mail account limited in relation to one or more prohibited operations (operation 304) may include but is not limited to intermediate device 108, sending device 104, and/or user device 106 receiving a signal related to a receipt of an item of electronic mail by a limited-use electronic mail account limited in relation to a prohibited accepting of one or more items of electronic mail (e.g., limited in relation to prohibitions regarding detecting the appearance of a piece of disallowed electronic mail and thereafter bouncing email from all but a limited group of email addresses).

In another instance, receiving a signal related to a receipt of an item of electronic mail by a limited-use electronic mail account limited in relation to one or more prohibited operations (operation 304) may include but is not limited to intermediate device 108, sending device 104, and/or user device 106 receiving a signal related to a receipt of an item of electronic mail by a limited-use electronic mail account limited in relation to a prohibited sending of an item of electronic mail (e.g., limited in relation to prohibitions regarding sending an item of electronic mail (e.g., to a disallowed address and/or having a disallowed content)).

In another instance, receiving a signal related to a receipt of an item of electronic mail by a limited-use electronic mail account limited in relation to one or more prohibited operations (operation 304) may include but is not limited to intermediate device 108, sending device 104, and/or user device 106 receiving a signal related to a receipt of an item of electronic mail by a limited-use electronic mail account limited in relation to a prohibited receiving of an item of electronic mail that includes a specified attachment (e.g., limited in relation to prohibitions regarding receipt of an email having an attachment from a prohibited address and/or having an attachment of a prohibited content).

Figure 4:
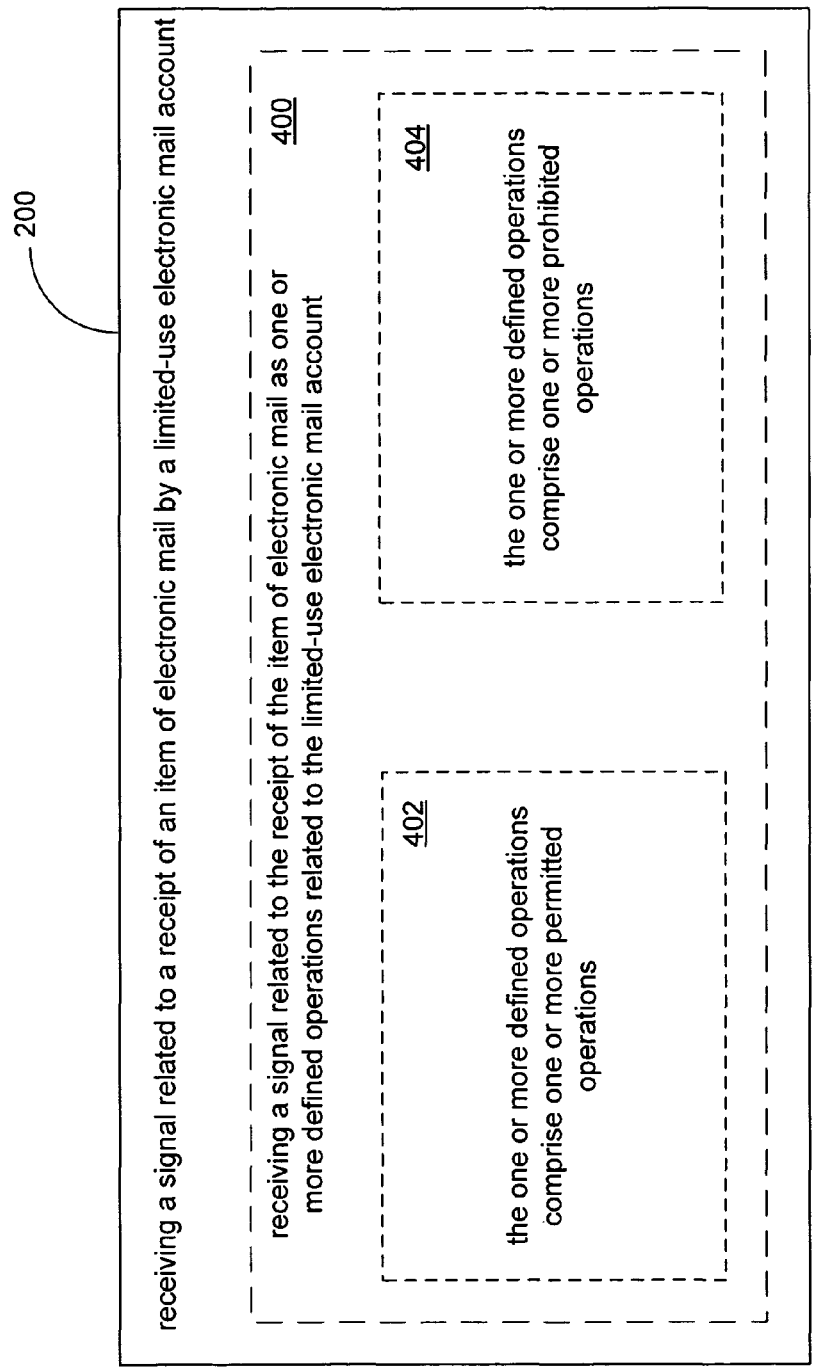
FIG. 4 illustrates several alternate implementations of the high-level logic flowchart of FIG. 2.

FIG. 4 illustrates several alternate implementations of the high-level logic flowchart of FIG. 2. Depicted is that one alternative implementation, operation 200—receiving a signal related to a receipt of an item of electronic mail by a limited-use electronic mail account—includes an operation 400 which shows receiving a signal related to the receipt of the item of electronic mail as one or more defined operations related to the limited-use electronic mail account (e.g., the receipt of an item of electronic mail is one of one or more operations defined by means of hardware/firmware/software embodied logic of intermediate device 108). Operation 400 may include one or more of operations 402 and/or 404. Operation 402 depicts that the one or more defined operations comprise one or more permitted operations (e.g., the permitted operation of receipt of an item of electronic mail that includes a specific subject line). Operation 404 depicts that the one or more defined operations comprise one or more prohibited operations (e.g., the prohibited operation of receipt of an item of electronic mail that is associated with a specified thread in a bulletin-board service ("BBS") or mail-based forum.

Figure 5:
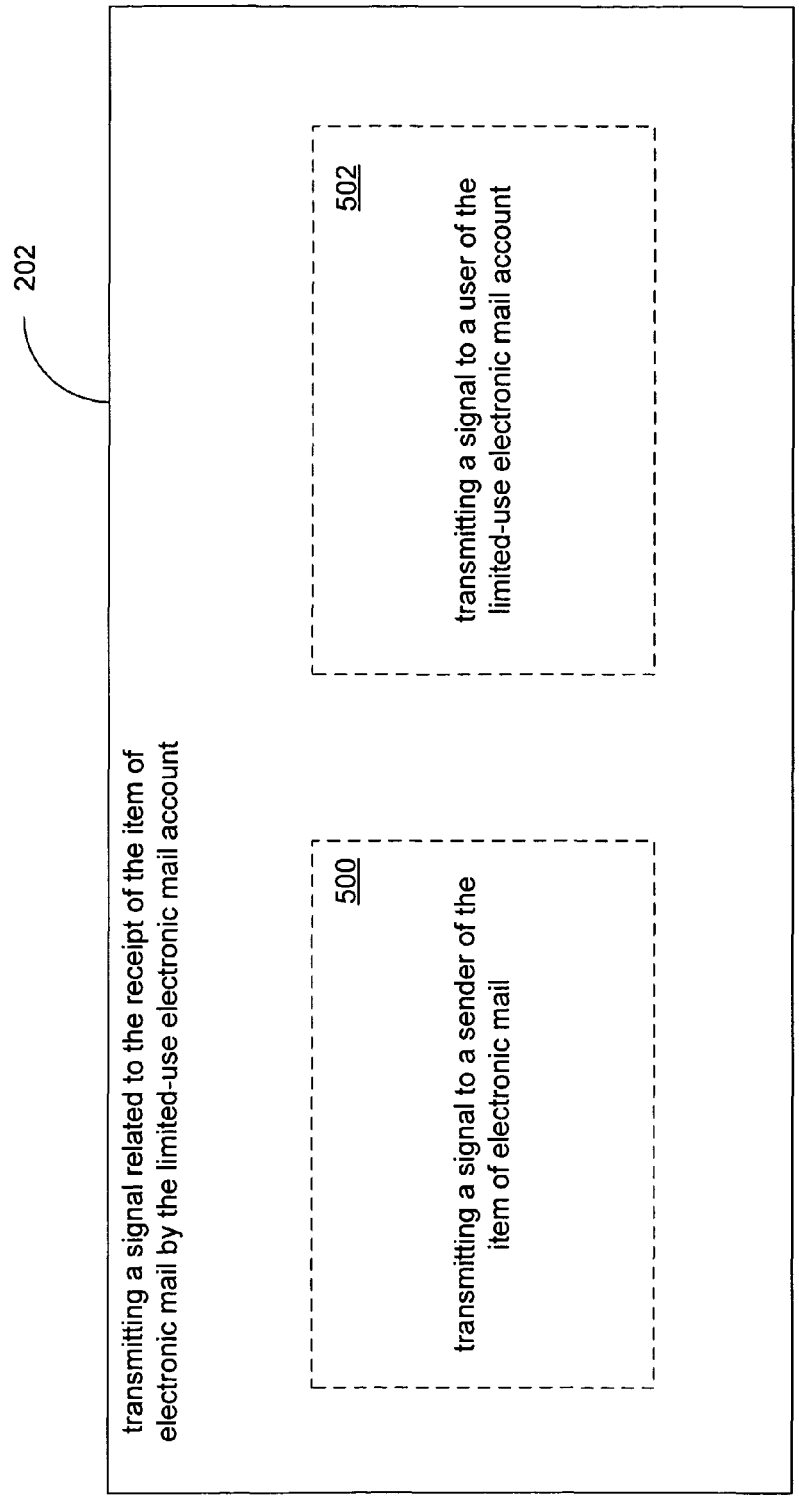
FIG. 5 shows several alternative implementations of the high-level logic flowchart of FIG. 2.

FIG. 5 shows several alternative implementations of the high-level logic flowchart of FIG. 2. Depicted is that one alternative implementation, operation 202—transmitting a signal related to the receipt of the item of electronic mail by the limited-use electronic mail account—may include operation 500, which illustrates transmitting a signal to a sender of the item of electronic mail (e.g., a signal including an acknowledgement of receipt of an item of electronic mail by the limited-use electronic mail account is transmitted to sender 100 by means of hardware/firmware/software embodied logic of intermediate device 108). Operation 202 may include operation 502, which illustrates transmitting a signal to a user of the limited-use electronic mail account (e.g., a signal including notification of receipt of an item of electronic mail from a specific sender 100 by a limited-use electronic mail account is transmitted to user 102 via user device 106 by means of hardware/firmware/software embodied logic of intermediate device 108).

Figure 6:
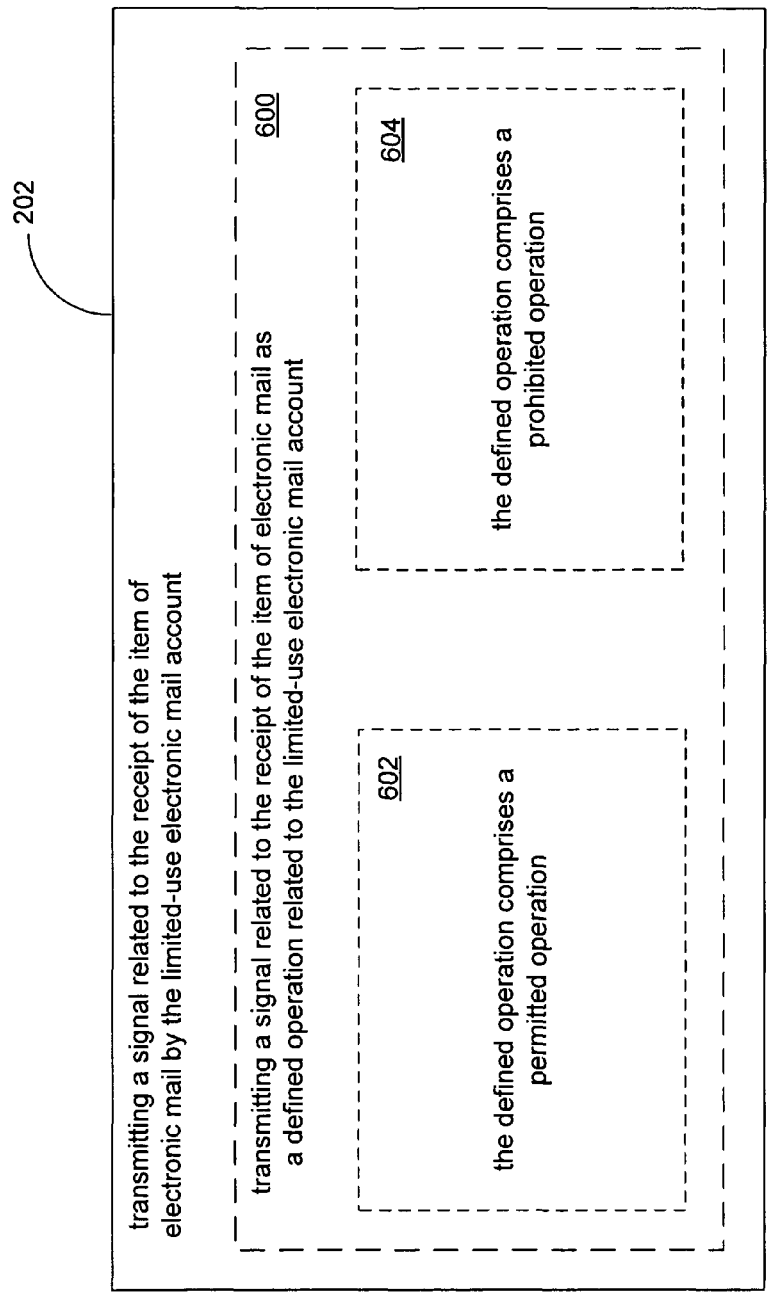
FIG. 6 shows several alternative implementations of the high-level logic flowchart of FIG. 2.

FIG. 6 shows several alternative implementations of the high-level logic flowchart of FIG. 2. Operation 202—transmitting a signal related to the receipt of the item of electronic mail by the limited-use electronic mail account—may include operation 600, which shows transmitting a signal related to the receipt of the item of electronic mail as a defined operation related to the limited-use electronic mail account (e.g., a signal including an acknowledgement of receipt of an item of electronic mail from a specified list of senders 100 by a limited-use electronic mail account is transmitted by means of hardware/firmware/software embodied logic of intermediate device 108). Operation 600 may include operations 602 and/or 604. Operation 602 shows that the defined operation comprises a permitted operation (e.g. the permitted operation of receipt of an item of electronic mail sent from any of a list of specified domains). Operation 604 shows that the defined operation comprises a prohibited operation (e.g., the prohibited operation of receipt of an item of electronic mail such that a specified maximum number of permitted items of electronic mail from a specific sender 100 is exceeded).

Figure 7:
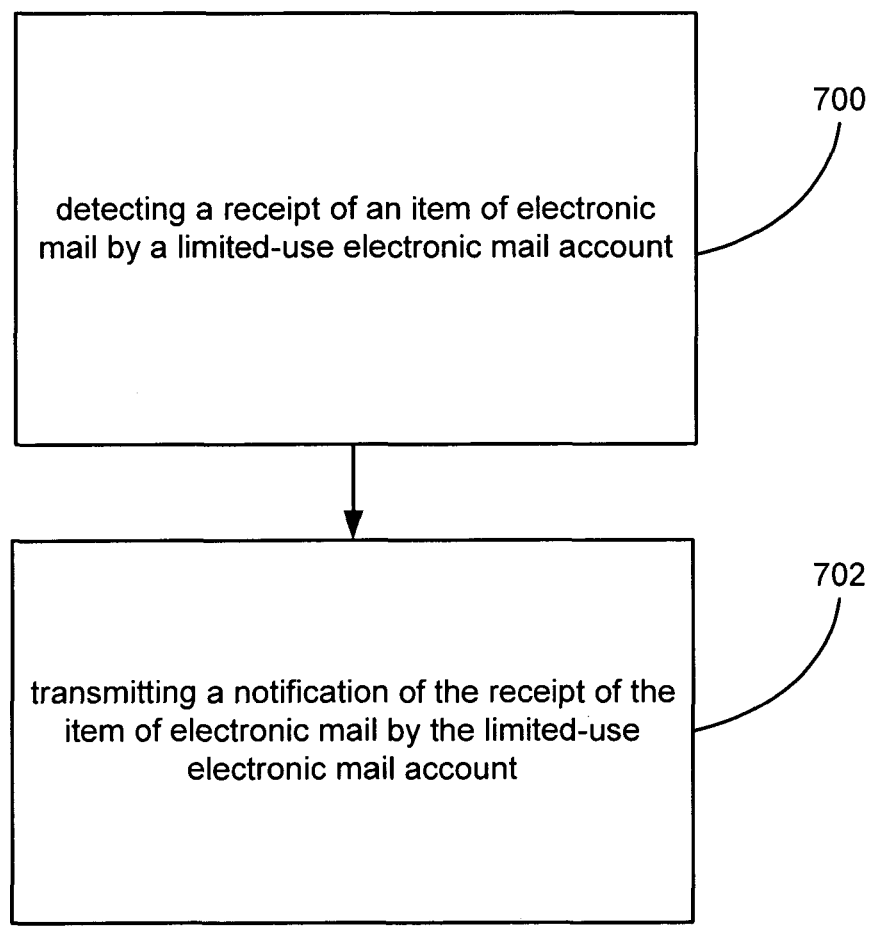
FIG. 7 depicts a high-level flowchart of an operational process.

FIG. 7 depicts a high-level flowchart of an operational process. Operation 700 shows detecting a receipt of an item of electronic mail by a limited-use electronic mail account (e.g., detecting the receipt of an item of electronic mail by limited-use electronic mail account by means of hardware/firmware/software embodied logic of intermediate device 108). Operation 702 shows transmitting a notification of the receipt of the item of electronic mail by the limited-use electronic mail account (e.g., transmitting a notification of the receipt of an item of electronic mail by a limited-use electronic mail account using hardware/firmware/software embodied logic of intermediate device 108).

Figure 8:
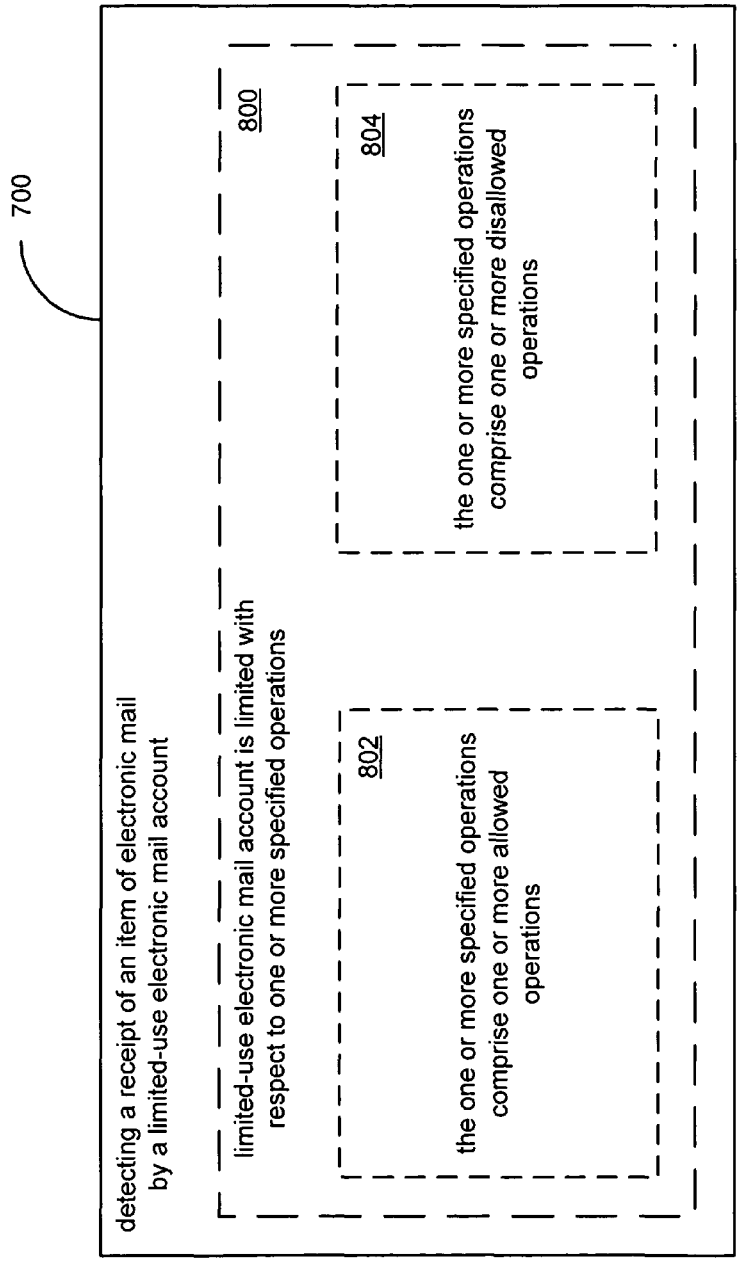
FIG. 8 illustrates several alternate implementations of the high-level logic flowchart of FIG. 7.

FIG. 8 illustrates several alternate implementations of the high-level logic flowchart of FIG. 7. Depicted is that one alternative implementation, operation 700—detecting a receipt of an item of electronic mail by a limited-use electronic mail account—includes an operation 800 which shows that the limited-use electronic mail account is limited with respect to one or more specified operations (e.g., the limited-use electronic mail account has limited-use aspects specified by means of hardware/firmware/software embodied logic of intermediate device 108). Operation 800 may include operations 802 and/or 804. Operation 802 depicts that the one or more specified operations comprise one or more allowed operations (allowed operations may include, for example, one or more of the following: printing and/or viewing a received and/or a stored item of electronic mail; printing and/or viewing a transmitted item of electronic mail; copying an item of electronic mail; printing a draft item of electronic mail; manipulating an item of electronic mail related to a defined project; forwarding an item of electronic mail; archiving and/or saving an item of electronic mail; logging an item of electronic mail; accepting one or more items of electronic mail; and sending an item of electronic mail).

Figure 9:
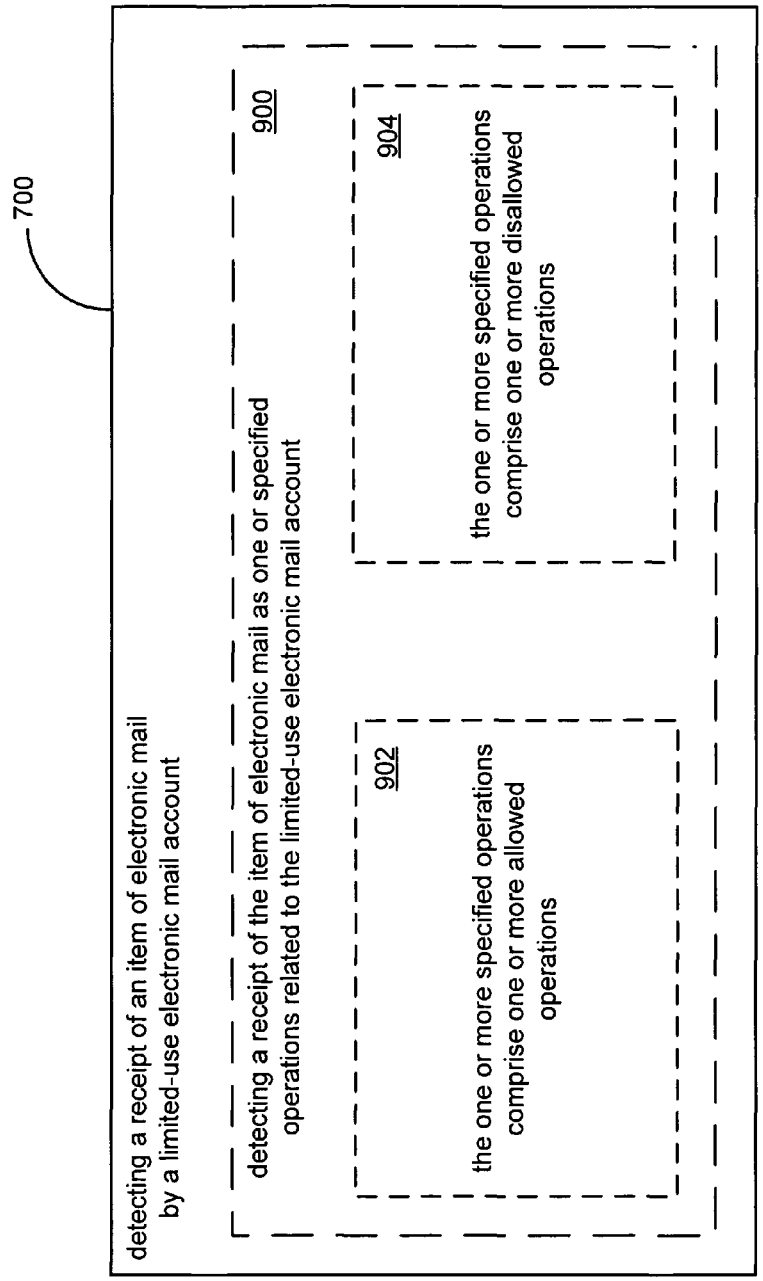
FIG. 9 illustrates several alternate implementations of the high-level logic flowchart of FIG. 7.

Operation 804 depicts that the one or more specified operations comprise one or more disallowed operations (disallowed operations may include, for example, one or more of the following: unauthorized printing and/or viewing of a received and/or a stored item of electronic mail; unauthorized printing and/or viewing of a transmitted item of electronic mail; unauthorized copying of an item of electronic mail; unauthorized printing of a draft item of electronic mail; unauthorized manipulation of an item of electronic mail related to a defined project; restricted forwarding of an item of electronic mail; unauthorized archiving and/or saving an item of electronic mail; unauthorized logging of an item of electronic mail; unauthorized acceptance of one or more items of electronic mail; and unauthorized sending of an item of electronic mail; and/or the disallowed operation of receipt of an item of electronic mail that includes a specific attachment). FIG. 9 illustrates several alternate implementations of the high-level logic flowchart of FIG. 7. Depicted is that one alternative implementation, operation 700—detecting a receipt of an item of electronic mail by a limited-use electronic mail account—includes an operation 900 which shows detecting a receipt of the item of electronic mail as one or more specified operations related to the limited-use electronic mail account (e.g., the receipt of an item of electronic mail is one of one or more operations specified by means of hardware/firmware/software embodied logic of intermediate device 108). Operation 900 may include one or more of operations 902 and/or 904. Operation 902 depicts that the one or more specified operations comprise one or more allowed operations (e.g., the allowed operation of receipt of an item of electronic mail sent by a specified sender 100). Operation 904 depicts that the one or more specified operations comprise one or more disallowed operations (e.g., the disallowed operation of receipt of an item of electronic mail that is associated with a specified thread of a BBS or mail-based forum).

Figure 10:
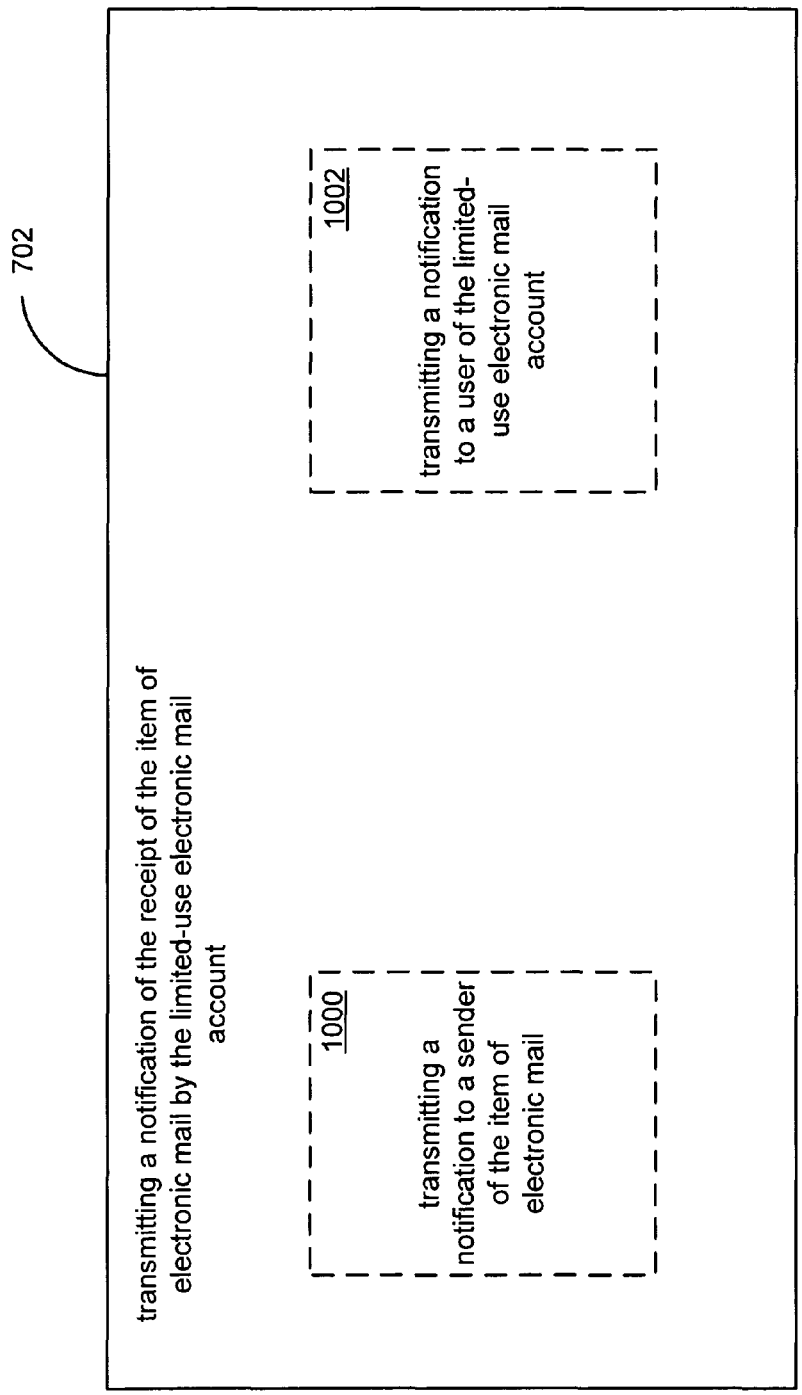
FIG. 10 shows several alternative implementations of the high-level logic flowchart of FIG. 7.

FIG. 10 shows several alternative implementations of the high-level logic flowchart of FIG. 7. Depicted is that one alternative implementation, operation 702—transmitting a notification of the receipt of the item of electronic mail by the limited-use electronic mail account—may include operation 1000, which illustrates transmitting a notification to a sender of the item of electronic mail (e.g., a signal including notification of receipt of an item of electronic mail from a specific sender 100 by limited-use electronic mail account is transmitted to sender 100 via user device 106 by means of hardware/firmware/software embodied logic of intermediate device 108). Operation 702 may include operation 1002, which depicts transmitting a notification to a user of the limited-use electronic mail account (e.g., a signal including notification of receipt of an item of electronic mail from a specific sender 100 by limited-use electronic mail account is transmitted to user 102 via user device 106 by means of hardware/firmware/software embodied logic of intermediate device 108).

Figure 11:
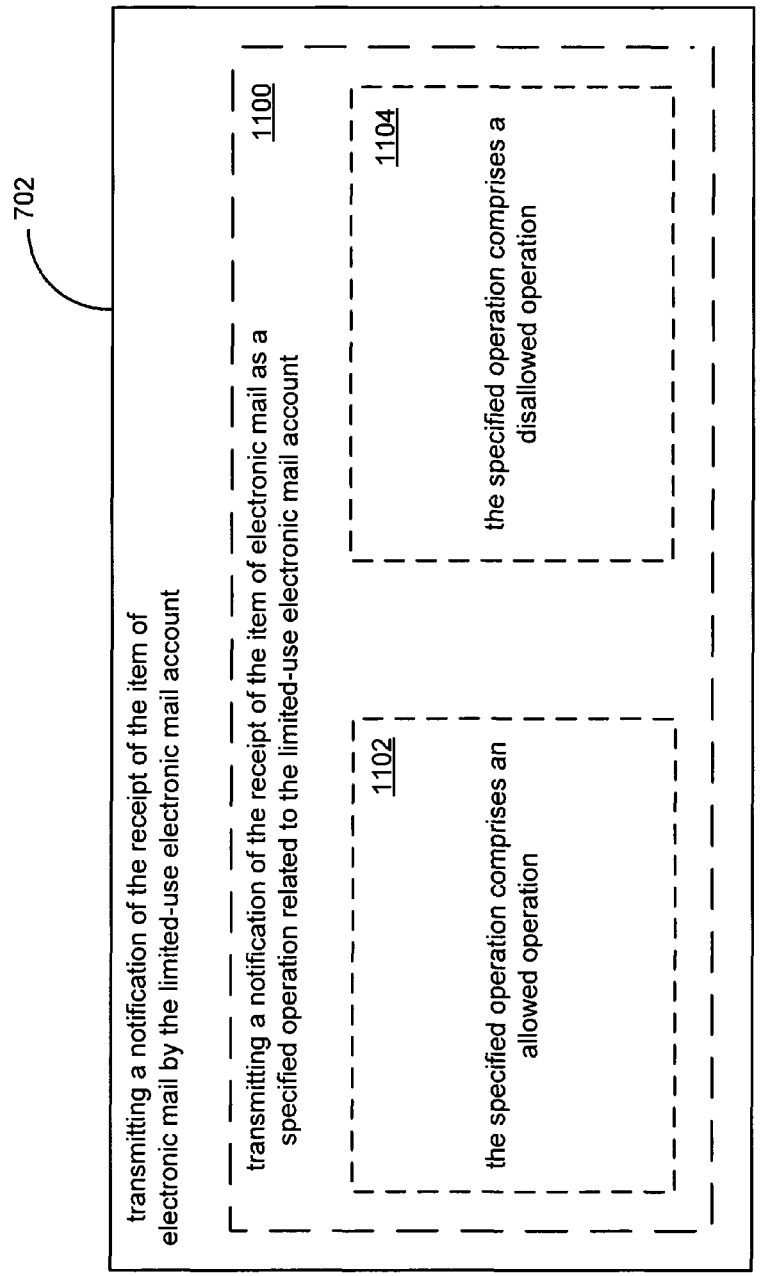
FIG. 11 shows several alternative implementations of the high-level logic flowchart of FIG. 7.

FIG. 11 shows several alternative implementations of the high-level logic flowchart of FIG. 7. Operation 702—transmitting a notification of the receipt of the item of electronic mail by the limited-use electronic mail account—may include operation 1100, which shows transmitting a notification of the receipt of the item of electronic mail as a specified operation related to the limited-use electronic mail account (e.g., a signal including a notification of receipt of an item of electronic mail from a specified list of senders 100 by limited-use electronic mail account is transmitted by means of hardware/firmware/software embodied logic of intermediate device 108). Operation 1100 may also include operations 1102 and/or 1104. Operation 1102 shows that the specified operation comprises an allowed operation (e.g., the allowed operation of receipt of an item of electronic mail such that a specified maximum number of permitted items of electronic mail from a specific sender 100 is not exceeded). Operation 1104 shows that the specified operation comprises a disallowed operation (e.g. the disallowed operation of receipt of an item of electronic mail sent from any of a list of specified domains).

Those skilled in the art will appreciate that the herein-described specific processes and/or devices and/or technologies are representative of more general processes and/or devices and/or technologies taught elsewhere herein, such as in the claims filed herewith and/or elsewhere in the present application.

Those having skill in the art will recognize that the state of the art has progressed to the point where there is little distinction left between hardware and software implementations of aspects of systems; the use of hardware or software is generally (but not always, in that in certain contexts the choice between hardware and software can become significant) a design choice representing cost vs. efficiency tradeoffs. Those having skill in the art will appreciate that there are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will typically employ optically-oriented hardware, software, and or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in standard integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies equally regardless of the particular type of signal bearing media used to actually carry out the distribution. Examples of a signal bearing media include, but are not limited to, the following: recordable type media such as floppy disks, hard disk drives, CD ROMs, digital tape, and computer memory; and transmission type media such as digital and analog communication links using TDM or IP based communication links (e.g., packet links).

In a general sense, those skilled in the art will recognize that the various aspects described herein which can be implemented, individually and/or collectively, by a wide range of hardware, software, firmware, or any combination thereof can be viewed as being composed of various types of "electrical circuitry." Consequently, as used herein "electrical circuitry" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of random access memory), and/or electrical circuitry forming a communications device (e.g., a modem, communications switch, or optical-electrical equipment).

Those skilled in the art will recognize that it is common within the art to describe devices and/or processes in the fashion set forth herein, and thereafter use standard engineering practices to integrate such described devices and/or processes into image processing systems. That is, at least a portion of the devices and/or processes described herein can be integrated into an image processing system via a reasonable amount of experimentation. Those having skill in the art will recognize that a typical image processing system generally includes one or more of a system unit housing, a video display device, a memory such as volatile and non-volatile memory, processors such as microprocessors and digital signal processors, computational entities such as operating systems, drivers, and applications programs, one or more interaction devices, such as a touch pad or screen, control systems including feedback loops and control motors (e.g., feedback for sensing lens position and/or velocity; control motors for moving/distorting lenses to give desired focuses. A typical image processing system may be implemented utilizing any suitable commercially available components, such as those typically found in digital still systems and/or digital motion systems.

Those skilled in the art will recognize that it is common within the art to describe devices and/or processes in the fashion set forth herein, and thereafter use standard engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

All of the above U.S. patents, U.S. patent application publications, U.S. patent applications, foreign patents, foreign patent applications and non-patent publications referred to in this specification and/or listed in any Application Data Sheet, are incorporated herein by reference, in their entireties.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of this subject matter described herein. Furthermore, it is to be understood that the invention is defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.).

We claim:

1. A method, comprising:
    receiving at least (i) an item of electronic mail and (ii) a period of time specified by a sender of the item of electronic mail, the period of time designating a period of time following invocation of a command to view at least a portion of the item of electronic mail after which encrypting the item of electronic mail will occur, including at least:
        displaying at least one image of the received item of electronic mail only (i) while a touch-screen of a user device associated with receiving the received item of electronic mail is engaged in association with the command to view the at least the portion of the received item of electronic mail and (ii) while a duration associated with the at least one specified period of time has not expired, wherein the duration is timed via the timer;
    detecting an invocation of a command to view at least a portion of the received item of electronic mail;
    starting a timer in response to detecting the invocation of the command to view the at least a portion of the received item of electronic mail;
    encrypting the received item of electronic mail in response to the timer reaching a value related to the specified period of time following invocation of the command to view the at least a portion of the received item of electronic mail; and
    transmitting a signal related to the viewing of the item of electronic mail.

2. The method of claim 1, wherein receiving at least (i) an item of electronic mail and (ii) a period of time specified by a sender of the item of electronic mail, the period of time designating a period of time following invocation of a command to view at least a portion of the item of electronic mail after which encrypting the item of electronic mail will occur, comprises:
    receiving at least (i) a message addressed to a phone number associated with the system receiving the message and (ii) a period of time specified by the sender of the message, the period of time designating a period of time following invocation of a command to view at least a portion of the message after which encrypting the message will occur.

3. The method of claim 1, wherein encrypting the received item of electronic mail in response to the timer reaching a value related to the specified period of time following invocation of the command to view the at least a portion of the received item of electronic mail comprises:
    encrypting the received item of electronic mail in response to the timer reaching a time related to the specified period of time following invocation of the command to view the at least a portion of the received item of electronic mail.

4. The method of claim 1, wherein encrypting the received item of electronic mail in response to the timer reaching a value related to the specified period of time following invocation of the command to view the at least a portion of the received item of electronic mail comprises:
    marking the received item of electronic mail as inaccessible in response to the timer reaching a value related to the specified period of time following invocation of the command to view the at least a portion of the received item of electronic mail.

5. A computer program product, comprising:
    at least one non-transitory computer-readable medium including at least:
        one or more instructions for receiving at least (i) an item of electronic mail and (ii) a period of time specified by a sender of the item of electronic mail, the period of time designating a period of time following invocation of a command to view at least a portion of the item of electronic mail after which encrypting the item of electronic mail will occur;
one or more instructions for detecting an invocation of a command to view at least a portion of the received item of electronic mail;
one or more instructions for starting a timer in response to detecting the invocation of the command to view the at least a portion of the received item of electronic mail;
one or more instructions for encrypting the received item of electronic mail in response to the timer reaching a value related to the specified period of time following invocation of the command to view the at least a portion of the received item of electronic mail; and
one or more instructions for transmitting a signal related to the viewing of the item of electronic mail.

6. A system, comprising:
a user device; and
one or more instructions that, when executed on the user device, cause the user device to at least:
receive at least (i) an item of electronic mail and (ii) a period of time specified by a sender of the item of electronic mail, the period of time designating a period of time following invocation of a command to view at least a portion of the item of electronic mail after which encrypting the item of electronic mail will occur;
detect an invocation of a command to view at least a portion of the received item of electronic mail;
start a timer in response to detecting the invocation of the command to view the at least a portion of the received item of electronic mail;
encrypt the received item of electronic mail in response to the timer reaching a value related to the specified period of time following invocation of the command to view the at least a portion of the received item of electronic mail expiring; and
transmit a signal related to the viewing of the item of electronic mail.

7. A system, comprising:
circuitry configured for receiving at least (i) an item of electronic mail and (ii) a period of time specified by a sender of the item of electronic mail, the period of time designating a period of time following invocation of a command to view at least a portion of the item of electronic mail after which encrypting the item of electronic mail will occur;
circuitry configured for detecting an invocation of a command to view at least a portion of the received item of electronic mail;
circuitry configured for starting a timer in response to detecting the invocation of the command to view the at least a portion of the received item of electronic mail;
circuitry configured for encrypting the received item of electronic mail in response to the timer reaching a value related to the specified period of time following invocation of the command to view the at least a portion of the received item of electronic mail; and
circuitry configured for transmitting a signal related to the viewing of the item of electronic mail.

8. The system of claim 7, wherein circuitry configured for receiving at least (i) an item of electronic mail and (ii) a period of time specified by a sender of the item of electronic mail, the period of time designating a period of time following invocation of a command to view at least a portion of the item of electronic mail after which encrypting the item of electronic mail will occur, comprises:
circuitry configured for receiving a signal related to a receipt of an item of electronic mail, the received item of electronic mail associated with a period of time specified by a sender of the received item of electronic mail, the period of time including at least a duration (i) for which viewing the item of electronic mail by the recipient will be allowed responsive to the recipient commanding the user device via a touch screen user interface to display at least a portion of the received item of electronic mail, and (ii) after which the user device will disable access to the received item of electronic mail via at least encrypting the received item of electronic mail in response to an expiration of the duration.

9. The system of claim 7, wherein circuitry configured for receiving at least (i) an item of electronic mail and (ii) a period of time specified by a sender of the item of electronic mail, the period of time designating a period of time following invocation of a command to view at least a portion of the item of electronic mail after which encrypting the item of electronic mail will occur, comprises:
circuitry configured for receiving an item of electronic mail, the received item of electronic mail including at least an image.

10. The system of claim 7, wherein circuitry configured for receiving at least (i) an item of electronic mail and (ii) a period of time specified by the sender of the item of electronic mail, the period of time designating a period of time following invocation of a command to view at least a portion of the item of electronic mail after which encrypting the item of electronic mail will occur, comprises:
circuitry configured for receiving at least (i) a message addressed to a phone number associated with the system receiving the message and (ii) a period of time specified by the sender of the message, the period of time designating a period of time following invocation of a command to view at least a portion of the message after which encrypting the message will occur.

11. The system of claim 7, wherein circuitry configured for encrypting the received item of electronic mail in response to the timer reaching a value related to the specified period of time following invocation of the command to view the at least a portion of the received item of electronic mail comprises:
circuitry configured for at least one of disabling or prohibiting access to the received item of electronic mail in response to the timer reaching a value related to the specified period of time following invocation of the command to view the at least a portion of the received item of electronic mail.

12. The system of claim 7, wherein circuitry configured for starting a timer in response to detecting the invocation of the command to view the at least a portion of the received item of electronic mail comprises:
circuitry configured for permitting one or more views of the at least a portion of the received item of electronic mail previous to the timer reaching a value related to the specified period of time, the timer started following invocation of a first command to view the at least a portion of the received item of electronic mail.

13. The system of claim 7, wherein circuitry configured for starting a timer in response to detecting the invocation of the command to view the at least a portion of the received item of electronic mail comprises:

circuitry configured for permitting viewing of at least a portion of the received item of electronic mail until the timer reaches a value related to the specified period of time.

14. The system of claim 7, wherein circuitry configured for transmitting a signal related to the viewing of the item of electronic mail comprises:
  circuitry configured for transmitting a signal related to the viewing of the received item of electronic mail, the signal associated with notifying the sender of the received item of electronic mail that at least a portion of the received item of electronic mail was displayed in response to an accepted user input via a user interface of the system.

15. The system of claim 7, further comprising:
  circuitry configured for receiving a signal related to detecting at least one prohibited operation by the recipient during a display by the system of the received item of electronic mail; and
  circuitry configured for transmitting a signal associated with notifying the sender of the received item of electronic mail related to the detecting at least one prohibited operation by the recipient during a display by the system of the received item of electronic mail.

16. The system of claim 15, wherein circuitry configured for receiving a signal related to detecting at least one prohibited operation by the recipient during a display by the system of the received item of electronic mail and circuitry configured for transmitting a signal associated with notifying the sender of the received item of electronic mail related to the detecting at least one prohibited operation by the recipient during a display by the system of the received item of electronic mail comprise:
  circuitry configured for receiving a signal related to detecting at least one attempted prohibited saving by the recipient during a display by the system of the received item of electronic mail and circuitry configured for transmitting a signal associated with notifying the sender of the received item of electronic mail that at least one prohibited saving was attempted by the recipient during a display by the system of the received item of electronic mail.

17. The system of claim 7, wherein the system comprises:
  at least one of a smartphone, a mobile phone, or a cellular phone.

18. The system of claim 7, wherein circuitry configured for receiving at least (i) an item of electronic mail and (ii) a period of time specified by a sender of the item of electronic mail, the period of time designating a period of time following invocation of a command to view at least a portion of the item of electronic mail after which encrypting the item of electronic mail will occur, comprises:
  circuitry configured for receiving at least (i) an item of electronic mail and (ii) a period of time specified by a sender of the item of electronic mail, the period of time designating a period of time following invocation of a command to view the item of electronic mail on the system during which at least a portion of the item of electronic mail will be viewable.

19. The system of claim 7, wherein circuitry configured for starting a timer in response to detecting the invocation of the command to view the at least a portion of the received item of electronic mail comprises:
  circuitry configured for detecting an invocation of a command to view the electronic mail on the system; and
  circuitry for starting a timer in response to detecting the invocation of the command, the timer configured for determining an end of a duration related to the specified period of time during which the electronic mail may be viewed.

20. The system of claim 7, wherein circuitry configured for encrypting the received item of electronic mail in response to the timer reaching a value related to the specified period of time following invocation of the command to view the at least a portion of the received item of electronic mail comprises:
  circuitry configured for encrypting the received item of electronic mail in response to the timer reaching a time related to the specified period of time following invocation of the command to view the at least a portion of the received item of electronic mail.

21. The system of claim 7, wherein circuitry configured for starting a timer in response to detecting the invocation of the command to view the at least a portion of the received item of electronic mail comprises:
  circuitry configured for starting a timer in response to detecting the invocation of the command to view the at least a portion of the received item of electronic mail, wherein subsequent invocations of the command to view the at least a portion of the received item of electronic mail are (i) operable to display the at least a portion of the received item of electronic mail until the timer reaches a value related to the specified period of time and (ii) have no effect after the timer reaches the value related to the specified period of time.

22. The system of claim 7, wherein circuitry configured for encrypting the received item of electronic mail in response to the timer reaching a value related to the specified period of time following invocation of the command to view the at least a portion of the received item of electronic mail comprises:
  circuitry configured for disabling invocation of a command to view at least a portion of the received item of electronic mail in response to the timer reaching the value related to the specified period of time following invocation of the command to view the at least a portion of the received item of electronic mail.

23. The system of claim 7, wherein circuitry configured for starting a timer in response to detecting the invocation of the command to view the at least a portion of the received item of electronic mail comprises:
  circuitry configured for displaying at least one image of the received item of electronic mail only (i) while a touch-screen of a user device associated with receiving the received item of electronic mail is engaged in association with the command to view the at least the portion of the received item of electronic mail and (ii) while a duration associated with the at least one specified period of time has not expired, wherein the duration is timed via the timer.

24. The system of claim 7, wherein circuitry configured for encrypting the received item of electronic mail in response to the timer reaching a value related to the specified period of time following invocation of the command to view the at least a portion of the received item of electronic mail comprises:
  circuitry configured for marking the received item of electronic mail as inaccessible in response to the timer reaching a value related to the specified period of time following invocation of the command to view the at least a portion of the received item of electronic mail.

25. The system of claim 7, further comprising:
circuitry configured for incrementing a counter related to a number of times received items of electronic mail have been viewed.

26. The system of claim 7, further comprising:
circuitry configured for deleting the received item of electronic mail subsequent to transmitting a signal related to the viewing of the item of electronic mail.

27. The system of claim 7, wherein circuitry configured for starting a timer in response to detecting the invocation of the command to view the at least a portion of the received item of electronic mail comprises:
circuitry configured for displaying at least a portion of the received item of electronic mail in response to detecting the invocation of the command to view the at least a portion of the received item of electronic mail.

28. The system of claim 7, wherein circuitry configured for receiving at least (i) an item of electronic mail and (ii) a period of time specified by a sender of the item of electronic mail, the period of time designating a period of time following invocation of a command to view at least a portion of the item of electronic mail after which encrypting the item of electronic mail will occur, comprises:
circuitry configured for receiving at least (i) an item of electronic mail and (ii) a period of time specified by a sender of the item of electronic mail, the period of time designating a period of time during which at least a portion of the item of electronic mail may be viewable.

29. The system of claim 7, wherein circuitry configured for receiving at least (i) an item of electronic mail and (ii) a period of time specified by a sender of the item of electronic mail, the period of time designating a period of time following invocation of a command to view at least a portion of the item of electronic mail after which encrypting the item of electronic mail will occur, comprises:
circuitry configured for receiving at least (i) an item of electronic mail and (ii) a period of time specified by a sender of the item of electronic mail, the period of time designating a period of time during which at least a portion of the item of electronic mail may be displayed by the system in response to invocation of a command to view the at least a portion of the item of electronic mail.

30. The system of claim 7, wherein circuitry configured for detecting an invocation of a command to view at least a portion of the received item of electronic mail comprises:
circuitry configured for detecting an invocation of a command to display at least a portion of the received item of electronic mail.

31. The system of claim 30, wherein circuitry configured for detecting an invocation of a command to display at least a portion of the received item of electronic mail comprises:
circuitry configured for detecting an invocation of a command to display at least a portion of the received item of electronic mail via a touch screen interface of the system.

32. The system of claim 7, wherein circuitry configured for starting a timer in response to detecting the invocation of the command to view the at least a portion of the received item of electronic mail comprises:
circuitry configured for allowing one or more viewings of at least a portion of the received item of electronic mail in response to input accepted via a user interface of the system until the timer reaches a value related to the specified period of time.

33. The system of claim 7, wherein circuitry configured for receiving at least (i) an item of electronic mail and (ii) a period of time specified by a sender of the item of electronic mail, the period of time designating a period of time following invocation of a command to view at least a portion of the item of electronic mail after which encrypting the item of electronic mail will occur, comprises:
circuitry configured for receiving at least (i) an item of electronic mail and (ii) a period of time specified by a sender of the item of electronic mail, the period of time designating a period of time during which at least a portion of the item of electronic mail may be displayed one or more times and after which the item of electronic mail may no longer be displayed.

34. A system, comprising:
at least one array of time-sequenced logic gates configured for receiving at least (i) an item of electronic mail and (ii) a period of time specified by a sender of the received item of electronic mail, the period of time designating a period of time following invocation of a command to view at least a portion of the item of electronic mail after which encrypting the item of electronic mail will occur;
at least one array of time-sequenced logic gates configured for detecting an invocation of a command to view at least a portion of the received item of electronic mail;
at least one array of time-sequenced logic gates configured for starting a timer in response to detecting the invocation of the command to view the at least a portion of the received item of electronic mail;
at least one array of time-sequenced logic gates configured for encrypting the received item of electronic mail in response to the timer reaching a value related to the specified period of time following invocation of the command to view the at least a portion of the received item of electronic mail; and
at least one array of time-sequenced logic gates configured for transmitting a signal related to the viewing of the item of electronic mail.

35. A mobile phone, comprising:
a touch screen;
a processing device; and
at least one non-transitory computer-readable storage medium bearing one or more instructions which, when executed on the processing device, cause the mobile phone to at least:
receive at least (i) an item of electronic mail and (ii) a period of time specified by a sender of the item of electronic mail, the period of time designating a period of time following invocation of a command to view at least a portion of the item of electronic mail after which encrypting the item of electronic mail will occur;
detect an invocation of a command received via the touch screen to view at least a portion of the received item of electronic mail;
start a timer in response to detecting the invocation of the command received via the touch screen to view the at least a portion of the received item of electronic mail;
display the at least a portion of the received item of electronic mail and at least one value associated with the timer on the touch screen; and
encrypt the received item of electronic mail in response to the timer reaching a value related to the specified period of time following invocation of the command to view the at least a portion of the received item of electronic mail.

* * * * *